DIGITAL INTEGRATOR WITH AUTOMATIC BASE LINE CORRECTION

Filed June 6, 1966 3 Sheets-Sheet 1

INVENTOR.
DOUGLAS H. SMITH

BY A. M. Fernandez

ATTORNEY

INVENTOR.
DOUGLAS H. SMITH
BY A. M. Fernandez
ATTORNEY

DIGITAL INTEGRATOR WITH AUTOMATIC BASE LINE CORRECTION

Filed June 6, 1966 3 Sheets-Sheet 3

INVENTOR.
DOUGLAS H. SMITH

BY A. M. Fernandez

ATTORNEY

United States Patent Office 3,506,818

Patented Apr. 14, 1970

3,506,818
DIGITAL INTEGRATOR WITH AUTOMATIC BASE LINE CORRECTION

Douglas H. Smith, Albany, Calif., assignor to Beckman Instruments, Inc., a corporation of California Filed June 6, 1966, Ser. No. 555,534
Int. Cl. G06g *7/18*; G06f *15/20*
U.S. Cl. 235—183 17 Claims

ABSTRACT OF THE DISCLOSURE

An apparatus for integrating the area under the peaks of a first electrical signal waveform which integration is performed with respect to a second electrical signal reference. The first and second electrical signals are simultaneously applied to a converter that provides a series of output pulses having time intervals related to the logarithm of the ratio of the amplitude of the first signal with respect to the amplitude of the second signal which output pulses are applied to an accumulator for totaling the time intervals of the output pulses associated with each signal peak. A correction means is connected to the converter for varying the amplitude of the second signal until it is equal to that of the first signal during time periods the accumulator is inactivated. A control means is responsive to the first signal to enable the accumulator during the presence of a signal peak and to enable the correction means during the absence of a peak. A recorder continuously records both the first and second electrical signals simultaneously, as a function of time.

This invention relates generally to automatic integrators, and more particularly to improvements in an integrator for analytical instruments of the type which produce a series of peak signals and which integrate the area under each peak. A common instrument of this type is an amino acid analyzer in which a photocell is employed as a transducer to provide an electrical signal comprising a series of peaks for analysis. It is the function of the integrator to assist in the analysis by automatically determining the area under each peak.

Digital integrators which automatically compute the areas under the peaks and print the results on a paper tape have been widely accepted because computing the areas under the peaks is time consuming and requires considerable experience. Moreover, the accuracy of the results achieved manually depends upon the operator's skill and judgment. A typical prior art automatic integrator is described by Sid Deutsch in an article titled, "Automatic Optical Density Integrator," published in The Review of Scientific Instruments, vol. 36, No. 3, March 1965, at pages 299 to 307.

A problem in using automatic integrators is that the areas under the peaks are calculated with respect to an electrical base line which tends to drift from the instrument base line or reference, and therefore must be corrected. The base line drift is usually at a uniform rate so that correction can readily be incorporated in an automatic integrator, but care must be taken not to continue the base line correction while integration is in progress for that may cause some of the area under the peak to be subtracted, or added. For small peak signals, such an error would be significant. Consequently, it is desirable to have both an automatic base line correction between peaks and some means for graphically determining the base line correction error present in a peak, if any. Thus, automatic base line correction should be made only during periods between peaks, and any error due to base line drift during the period of peak integration should be corrected graphically if necessary. However, if peaks occur too close together, the saddle between them may not reach the base line. Under those circumstances, a greater error would occur if the electrical base line of the integrator were to be corrected to the saddle between the peaks, the apparent base line of the chromatograph. Under those circumstances, it would be desirable to disable the automatic base line drift corrector.

Automatic integrators generally use the first derivative of the input signal to start and stop the integration process for each peak. However, the input signal to the slope detector may suddenly shift to a new level to initiate the integration cycle which, once having been started, will continue until the first derivative of an opposite sign is produced. When such a plateau occurs in the waveform, it is desirable to provide some means for recognizing it as a plateau and to terminate the integration cycle in order to be able to start the integration of the area under the next peak.

As noted hereinbefore, the transducer used in an amino acid analyzer is a photocell the output current of which is proportional to the intensity of light sensed by the photocell which intensity is in turn a function of the transmittance of the sample being monitored. On the other hand the absorbance of the sample (which is proportional to the concentration or quantity) is a logarithmic function of the transmittance. More specifically, the absorbance A is related to the transmittance T by the equation:

$$A=\log_{10}(1/T)$$

Where T is approximately equal to the ratio of $I(t)$, a point on the input waveform, to $I_0$, a point on the base line at the same time $t$. Thus, a logarithmic conversion must be made before the peak areas can be evaluated to determine the amount or quantity of each constituent making up the sample. The automatic integrator samples the input waveform periodically and computes the absorption at each interval by first converting the amplitude of the signal sampled to a signal which is proportional to the logarithm of the ratio of two analog inputs $I(t)$ and $I_0$, or $V_0$ and $V_t$, and then converting that analog signal to linear digital units for accumulation. Thus a principal object of the invention is to provide improved means for converting an analog signal from logarithmic to linear digital units.

Another object of the invention is to provide a new and improved system for automatic base line correction in an automatic integrator.

These and other objects of the invention are achieved in one illustrative embodiment for use in an amino acid analyzer, although, obviously, such an invention may be advantageously employed in other instruments whenever it is desired to automatically calculate the area under each peak of an input signal as it occurs, and to display the integral in digital form. In the illustrative embodiment, the integrator is adapted to receive an input signal from a colorimeter, and to operate on the input signal to determine a value in a digital form which is equal to the area under a given peak, the area being proportional to the quantity of one amino acid in a sample.

The various amino acids are first separated in the sample by ion-exchange chromatography, then subjected to chemical reaction with a ninhydrin reagent. The reaction produces color compounds which are then sequentially scanned by the combination of a light source and a photocell in a colorimeter. The output signal of the photocell is proportional to the transmittance of the colored compounds. However, the concentrations of the various amino acids are linearly related to the absorbance of the colored compounds. Accordingly, a logarithmic conversion must be made to convert transmittance to absorbance before the area of a given peak is calculated to determine the quantity of the amino acid. For that purpose, a logarithmic analog-to-digital converter is provided. It receives both the output signal from the photocell and an internal reference or base line signal, and periodically produces in response thereto digital output signals directly proportional to the logarithm of the amplitude of the input signal derived from the photocell with respect to the reference or base line signal.

An accumulator is coupled to the converter to sum all of the digital output signals associated with a given peak thereby integrating the area under one peak. A printer coupled to the accumulator provides a record of the peak integrals. A program control unit is provided to start and stop the integration cycle for each peak, and to cause the integral to be printed after the integration cycle has been stopped. The internal reference or base line signal is automatically adjusted to correct for any drift of the colorimeter reference or base line by causing it to be equal to the signal from the photocell between peaks. To accomplish that, the program control unit is connected to an automatic base line corrector to effectively disable the base line corrector's input derived from the logarithmic converter, and cause the base line corrector's last output to be maintained as the base line until integration is again stopped and the automatic base line corrector is again enabled.

Both the electrical signal input to the logarithmic anlog-to-digital converter and the electrical reference signal from the automatic base line corrector are recorded in a conventional multichannel strip-chart recorder in order that any base line drift which occurs during peak integration can be manually corrected, particularly for low level peak signals, because if not manually corrected the error can be substantial. This ability to correct for base line drift during peak integration is also important when the analyzer is equipped with a high sensitivity cuvette, or an expanded range recorder, or both.

After the integration cycle for a peak has been stopped a predetermined delay is introduced before again enabling the automatic base line corrector in order to avoid adjusting the base line to a saddle between twin peaks, i.e., a valley between two peaks occurring so close together as to overlap, because for twin peaks, it is preferable to assume the same base line for both, but to integrate the area under the peaks separately. Two accumulators are provided for that purpose in order that integration for the second peak may proceed while the integral of the first peak is being printed.

A sudden shift of the electrical signal input away from the internal reference or base line may be misinterpreted as a peak even though it is only a plateau, i.e., an electrical signal input which levels off without returning to the base line. In order that the system will not continue to integrate the area under such a plateau, means are provided to automatically stop the integration after a predetermined time to avoid interference with the integration of true but small or flat peaks.

The converter comprises means for charging, or discharging, a fixed capacitance to a predetermined potential, and then exponentially discharging, or charging it, at a predetermined rate through the potential levels of the electrical signal input and the electrical base line signal. Separate means is provided to determine the time $t_1$ at which the exponentially changing signal from the capacitance passes through the electrical base line signal level. The interval between the time $t_1$ and the time $t_2$ at which the exponentially changing signal passes through the electrical signal input is proportional to the logarithm of the ratio of the two levels and therefore linearly related to absorbance (the electrical signal input with reference to the electrical base line signal). Clock pulses from a suitable source are gated during that interval $(t_2-t_1)$ to provide a digital output from the converter.

Other objects and advantages will become apparent from the following description of the illustrative embodiment of the present invention just described briefly, taken in conjunction with the accompanying drawings in which.

Figure 1:
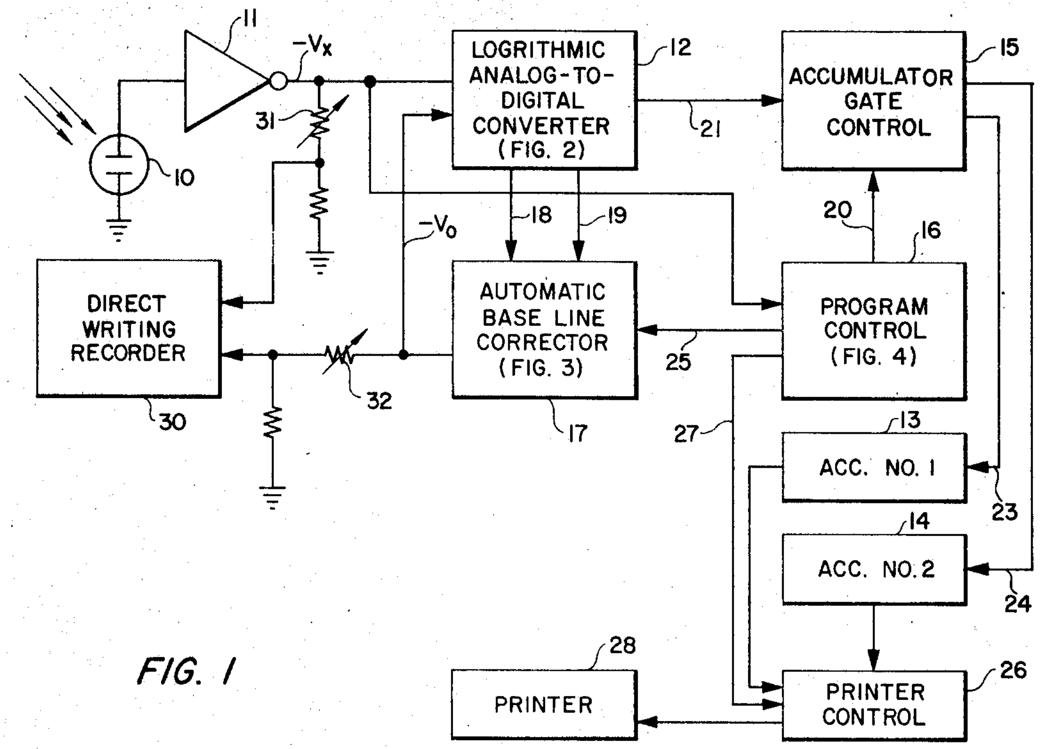
FIGURE 1 is a system block diagram.
Figure 2:
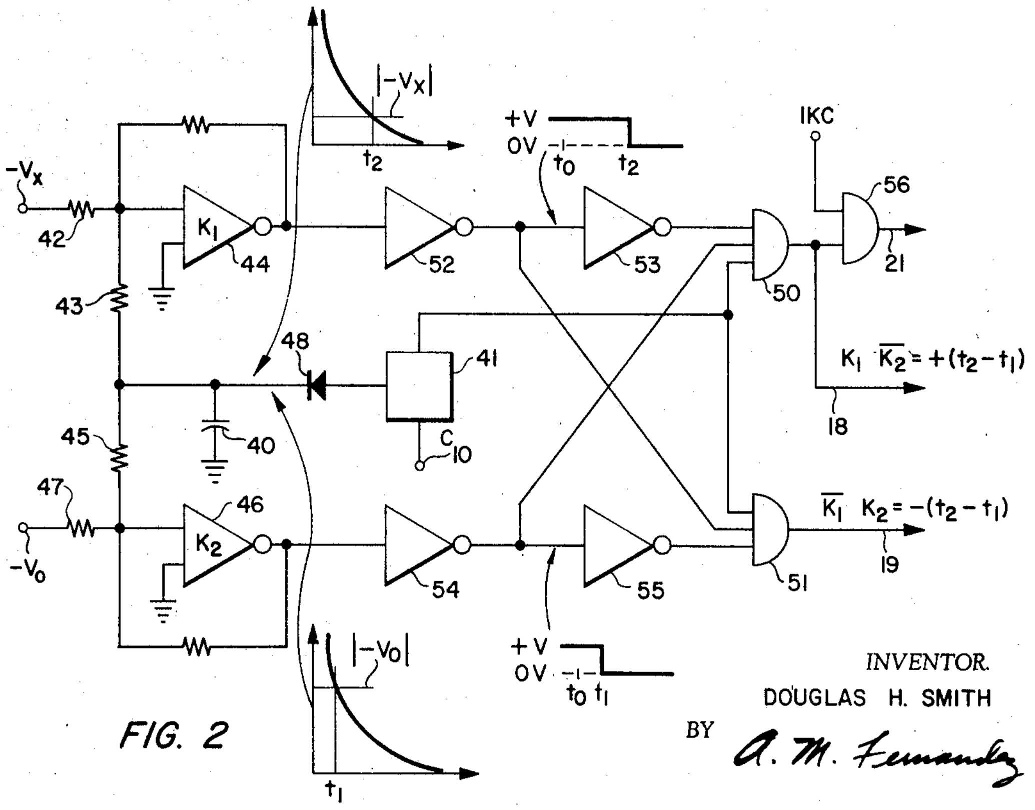
FIGURE 2 is a schematic diagram of a logarithmic analog-to-digital converter employed to advantage in the system of FIGURE 1.

Referring now to FIGURE 1 of the drawings, an electrical signal input derived from a photocell 10 is coupled by an amplifier 11 as an electrical signal input $-V_x$ to a logarithmic analog-to-digital converter 12 which, as will be described more fully with reference to FIGURE 2, is operating continuously to provide digital output signals to an accumulator 13 or an accumulator 14 through an accumulator gate control 15 during a peak integration cycle under the control of a program control unit 16. Converter 12 also provides control pulses (both of which are positive in polarity) over lines 18 and 19 between peak integration cycles for control of an automatic base line corrector 17 which adjusts the reference or electrical base line signal $-V_0$ so that it tracks the electrical signal input $-V_x$ during intervals between integration cycles. As will be discussed in more detail hereinafter, the polarity of the electrical base line correction signal is determined by which output line (18 or 19) the control pulse appears.

Figure 3:
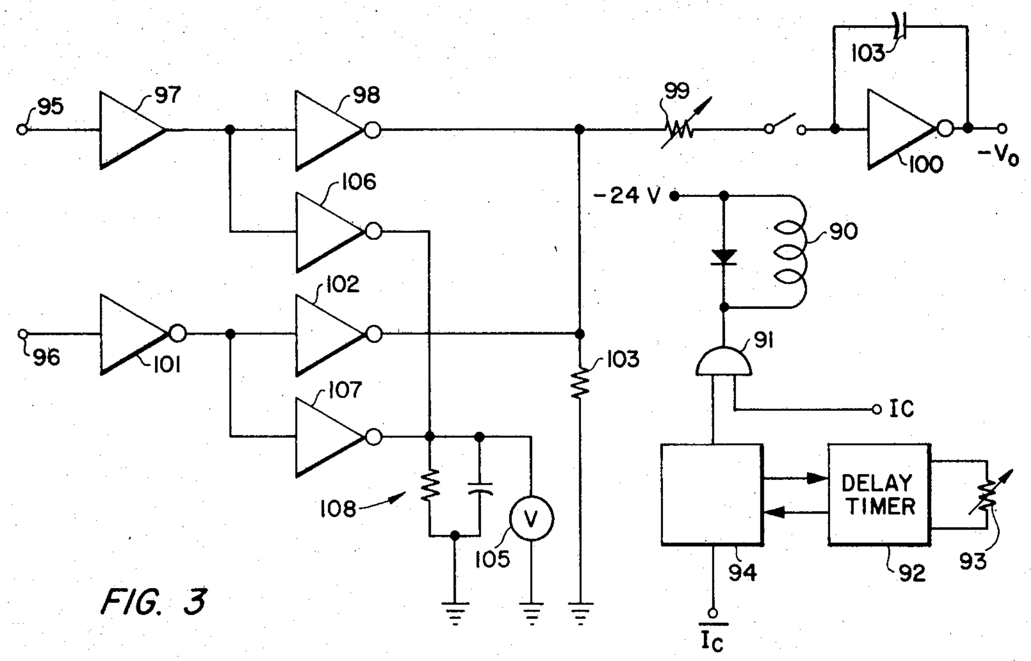
FIGURE 3 is a schematic diagram of an automatic base line corrector for the system of FIGURE 1.

The system automatically starts and stops an integration cycle for each peak of the signal $-V_x$. As used throughout this description it will be understood that signal "peak" means that portion of an electrical signal waveform defined by the excursion of the signal amplitude from and back to a predetermined reference value. That is accomplished by the program control unit 16 which is also connected to the amplifier 11. Control logic (described more fully hereinafter with reference to FIGURE 4) senses the beginning of a peak in the signal input $-V_x$ and activates the accumulator gate control 15 over a line 20. Digital output signals proportional to the logarithm of the ratio of the electrical signal input $-V_x$ and the base line signal $-V_0$ are transmitted over a line 21 and directed to one of the two accumulators 13 and 14 over respective lines 23 and 24. When the end of the peak is detected by the program control unit 16, the accumulator gate control is deactivated to terminate transmission of digital output signals and, as will be explained more fully hereinafter with reference to FIGURE 3, to activate the automatic base line corrector 17 through a line 25. At the same time, a print control unit 26 is activated through a line 27 in response to which a number representing the integral of a peak is printed on a paper tape by a printer 28. In one embodiment, the most significant digit of each number printed is incremented by one to facilitate correlating the number with a peak recorded on a chart produced by a direct-writing recorder 30 connected to the amplifier 11 by a potentiometer 31. The recorder 30 also records the electrical base line signal $-V_o$ transmitted thereto over a potentiometer 32. The potentiometers 31 and 32 are provided for zero alignment of the system upon installation. In a preferred embodiment the duration of each integration cycle is recorded by a third pen in the recorder 30, as by recording an integration control signal IC transmitted thereto by the program control unit 16 over a line (not shown).

After the integration cycle for a given peak, the automatic base line corrector 17 is activated by the program control unit over the line 25 in order to adjust the internal electrical base line reference signal $-V_o$ to the colorimeter reference, which is the electrical signal input $-V_x$ between peaks. To accomplish that, the electrical signal input $-V_x$ is effectively compared to the base line signal $-V_o$ by the logarithmic analog-to-digital converter which then transmits a control pulse over line 18 or 19 depending upon whether the base line signal $-V_o$ is less than or greater than the electrical signal input $-V_x$. As noted hereinbefore, the time duration of the pulse is a function of the amplitude of that difference.

When the next peak in the electrical signal $-V_x$ occurs, the program control unit 16 initiates another integration cycle and, through the accumulator gate control 15, routes the digital output signals from the logarithmic analog-to-digital converter 12 to the other accumulator, such that, for example, the first and all odd numbered peaks of a sequence are integrated by the accumulator 13, and all even numbered peaks are integrated by the accumulator 14. However, it should be recognized that although the provision of two accumulators is preferred, it is not necessary in order to practice the present invention. Instead, a buffer register may be provided to clear the accumulator, if only one is provided, and make it available for the next integration cycle while the printer, which operates at a much slower speed, prints a number representing the area under the peak which was stored in the buffer register during the preceding cycle.

It should be noted that the integral printed represents the area of the integrated peak to which it corresponds, but that such an integral is a relative value with respect to the quantity of the amino acid in the colored compound scanned to produce the peak in the signal input $-V_x$. The true quantity values are later obtained by applying a conversion factor determined in a calibration run. It should also be noted that an amino acid analyzer typically includes three photocells, at least two of which are recorded and sampled for analysis. Accordingly, although not shown, it should be understood that a second amplifier connected to another photocell is provided with a relay switch for automatically substituting the second amplifier for the first in the system at a time during an analysis run determined by a timer provided for that purpose. Control logic is provided to automatically return the first amplifier to the system.

The transducer in a colorimeter provides an output signal which is proportional to the transmittance of the sample through which light to the photocell 10 passes. However, it is desirable to know the concentration of the colored compound in the sample, and it is known that the concentration is linearly related to absorbance. It is for that reason that in the system of FIGURE 1, a logarithmic converter is employed, as noted hereinbefore. To prepare the signal for peak area evaluation in order to determine concentration, the signal is first converted into a time interval pulse. This pulse governs the number of 1 kc. clock pulses which are applied to accumulator gate control 15 in a manner to be presently discussed. The logical expressions for control pulses transmitted over lines 18 and 19 to the automatic base line corrector 17 (FIGURE 1) are as follows:

$$-(t_2-t_1)=\overline{K}_1K_2$$

$$+(t_2-t_1)=K_1\overline{K}_2$$

where $\overline{K}_1$ and $\overline{K}_2$ are positive signals transmitted by the amplifiers 44 and 46 when the capacitor has discharged its stored energy to absolute values of voltage below the absolue values of the input signal $-V_x$ and the electrical base line signal $-V_o$. Although both control pulses are positive in polarity as mentioned hereinbefore, for descriptive purposes, the control pulse having a time interval $-(t_2-t_1)$ and appearing on output line 19 will be referred to as a negative time interval pulse corresponding to the (−) sign in the logical expression while conversely, the control pulse having a time interval $+(t_2-t_1)$ and appearing on output line 18 will be referred to as a positive time interval pulse corresponding to the (+) sign in the logical expression.

The logarithmic analog-to-digital converter 12 illustrated schematically in FIGURE 2 is employed to greatly simplify digital readout in the present invention and may be similarly employed in other instruments in which the unkown is a logarithmic function of the electrical signal input. An amino acid analyzer is but one example; another example would be an absorption spectrophotometer. The converter can also be employed to perform such operations as multiplication, division, raising an arbitrary number to an arbitrary power, logarithmic transformation, exponenation, and combinations thereof. The utility of this new and improved converter is here illustrated in an automatic integrator for amino acid analyzers by way of example only.

The converter is based on the exponential time decay of voltages and currents in an RC circuit comprising a capacitor and resistor effectively in parallel with the capacitor. If the capacitor is charged to some arbitrary voltage by an external source, and then allowed to discharge, the voltage and the current will decay exponentially with time. It can be shown that by comparing two electrical input signals $V_o$ or $I_o$ and $V_x$ or $I_x$ with the exponentially decreasing voltage or current of the RC circuit, a time pulse of duration $t_x$ proportional to the logarithim of the ratio of the two inputs can be obtained by either of the following:

$$t_x=RC\ \ln\left(\frac{V_o}{V_x}\right)$$

$$t_x=RC\ \ln\left(\frac{I_o}{I_x}\right)$$

Where:

$$\ln \triangleq \log_e$$

If during the time $t_x$ a clock pulse train of frequency $f$ is accumulated, the total number of digital output signals accumulated at the end of the time $t$ is given by either of the following:

$$n=fRC\ \ln\left(\frac{V_o}{V_x}\right)$$

$$n=fRC\ \ln\left(\frac{I_o}{I_x}\right)$$

Several methods can be devised for achieving logarithmic conversion with this basic transfer function, but a method which seeks to charge the capacitor to the reference signal and then determine the time required to discharge the capacitor to the input signal requires switches for sequentially connecting the reference and input signals to a differential amplifier, as well as a switch in a feedback path to charge the capacitor while the reference signal is connected to the differential amplifier. The logarithmic analog-to-digital converter of the present invention illustrated in FIGURE 2 employs a dual comparison method; in particular, a dual current comparison, although it will be understood by those skilled in the art that dual voltage comparison may also be employed, and that instead of discharging a capacitor exponentially, conversion may be accomplished in a similar manner by charging a capacitor exponentially while performing the dual comparison.

In the dual current comparison method, a capacitor 40 is charged through flip-flop 41 from the voltage source (not shown) supplying power to the flip-flop 41 to an arbitrary voltage $+V_c$ greater than the absolute value of input signal voltage $-V_x$ with no peak present. Summing resistors 42 and 43 connected to the summing junction of an operational amplifier 44 are selected to be equal to each other, and equal to a summing resistor 45 connected to the summing junction of an operational amplifier 46. A summing resistor 47 coupling a reference voltage $-V_o$ from the automatic base line corrector 17 (FIGURE 1) to the summing junction of the amplifier 46 may also be selected to be equal to the other summing resistors. However, it should be understood that any one of the summing resistors, such as the resistor 47, may be selected to have any resistance required in order to scale the electrical base line signal $-V_o$ to the signal input $-V_x$, or vice versa.

A timing signal $C_{10}$ is applied to the flip-flop 41 to periodically allow the capacitor 40 to charge and to discharge through the summing resistors 43 and 45. The source may, for example, be a flip-flop and the timing signal $C_{10}$ be clock pulses at 10 cycles per second. A blocking diode 48 is provided to effectively disconnect the flip-flop 41 (and thus the voltage source) while the capacitor 40 is discharging. At some time after the capacitor 40 starts to discharge, the currents in the resistors 43 and 45 will equal the input currents through the resistors 42 and 47, and the outputs of the amplifiers 44 and 46 will change polarity. If the output signal from the amplifier 44 changes polarity first, it is known that the electrical signal input $-V_x$ is greater than the electrical internal base line signal $-V_o$. The time which lapses before the output signal of the amplifier 46 changes polarity is directly proportional to the logarithm of the absolute amplitude of the electrical signal input $-V_x$ with respect to the electrical base line signal $-V_o$. Since voltage input is directly proportional to current through a summing resistor connected to an operational amplifier, the time may be expressed in the following manner:

$$t_2-t_1=K\log_{10}\left(\frac{V_o}{V_x}\right)$$

where $K=RC1n10$

AND gates 50 and 51 are employed to detect the positive and negative time interval pulses, respectively. Inverting amplifiers 52 and 53 couple the output terminal of the amplifier 44 to the AND gate 50, and inverting amplifiers 54 and 55 couple the output terminal of the amplifier 46 to the AND gate 51. The output terminals of the inverting amplifiers 52 and 54 are connected to the AND gates 51 and 50, respectively, in order to mechanize the foregoing equations for the two positive and negative time interval signals. The AND gates 50 and 51 are designed to provide time interval pulses of positive polarity at their output terminals only when all of their input terminals are at zero potential. For instance, for the positive time interval pulse appearing on line 18 derived from the AND gate 50, it is necessary for the output of the amplifier 46 to reverse polarity at time $t_1$ when the voltage of the discharging capacitor 40 becomes less than $|-V_o|$ before the output of the operational amplifier 44 similarly reverses polarity. Thus, the output of the inverting amplifier 52 remains positive until time $t_2$ while the output of the inverting amplifier 54 switches to zero volts at time $t_1$. The inverting amplifier 53 translates the output of amplifier 52 to a zero volt signal to partially enable the AND gate 50. However, the AND gates 50 and 51 cannot be fully enabled except while the flip-flop 41 is reset to back-bias the diode 48 and provide a zero potential to the AND gates 50 and 51.

These time interval pulses derived from the AND gates 50 and 51 are directly proportional to the logarithm of the electrical signal $-V_x$ as required for the automatic base line correction. In order to provide logarithmic analog-to-digital conversion, an AND gate 56 is connected to the output terminal of the AND gate 50. The other input terminal of the AND gate 56 is connected to a source of clock pulses at a frequency of 1 kc. The number of pulses transmitted by the AND gate 56 is directly proportional to the positive time interval pulse and therefore directly proportional to the logarithm of the electrical signal input $-V_x$ as required for integration. In effect AND gate 56 in response to a series of time interval pulses provides a series of output pulse trains with each train of pulses representing an increment of area under peaks of the input signal waveform. No other linear analog-to-digital converter is required. Thus, it can be seen that with the AND gate 56, the logarithmic converter can be incorporated into a system which requires a digital output much more easily than logarithmic converters of other forms. A corresponding gate is not connected to the AND gate 51 to convert the negative time interval pulses appearing on line 19 to a number of pulses directly proportional to the time interval $t_2-t_1$ for the reason that in an amino acid analyzer only peaks of one polarity occur.

As noted hereinbefore, this logarithmic analog-to-digital converter may be employed to advantage in other applications, such as in spectrophotometry which is very much the same as ion exchange chromatography employed for amino acid analysis except that in spectrophotometry two samples are compared, one sample being the unknown and the other the reference. The absorbance is then found from the relation:

$$A=\log_{10}(I_o/I_x)$$

expressed in units of optical density where $I_o$ is the current from the photodetector associated with the reference, and $I_x$ is the current from the photodetector associated with the unknown. Thus, the logarithmic analog-to-digital converter of FIGURE 2 can be used directly to obtain the absorbance A of the unknown sample. The only difference is that in an amino acid analyzer, the sample is in a fluid flow system which produces a sequence of signal peaks, each of which must be analyzed individually whereas in spectrophotometry, the sample is static. In other words, in spectrophotometry, only one cycle of the flip-flop 41 is required to obtain the absorbance of the unknown sample, whereas successive cycles of the flip-flop 41 are required to alternately charge the capacitor 40 and obtain a time interval pulse $+(t_2-t_1)$ at the output of the AND gate 50 in order to integrate the area under a peak of the electrical signal input $-V_x$.

Figures 5, 6:
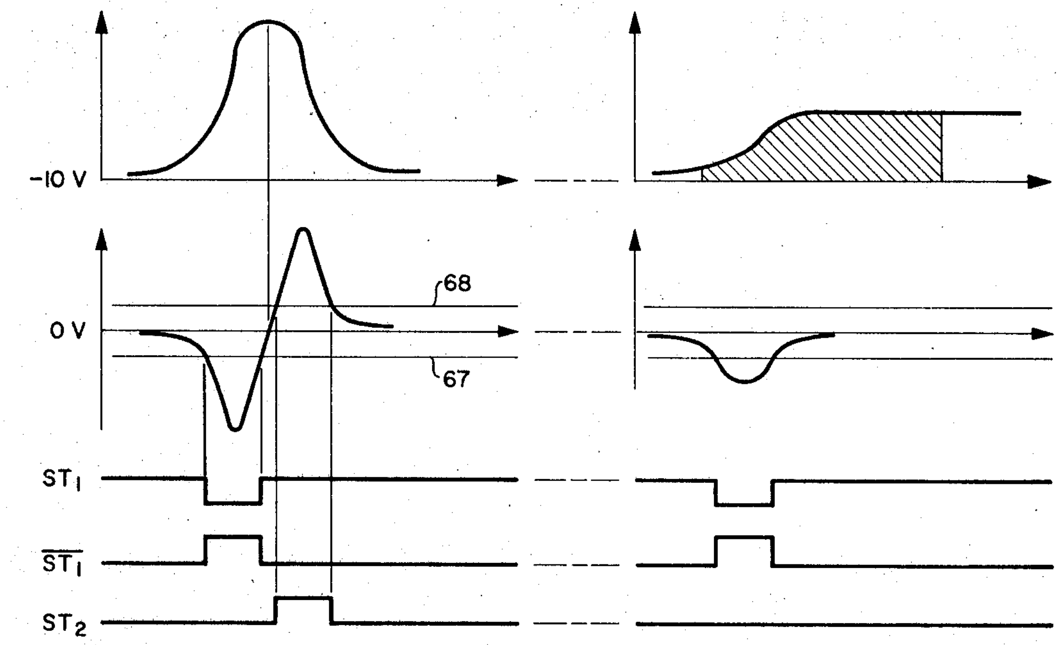
FIGURE 5 is a waveform diagram illustrating the manner in which the program control unit of FIGURE 4 starts and stops the integration cycle for a peak in an electrical signal input to the system of FIGURE 1.
FIGURE 6 is a waveform diagram illustrating the manner in which integration is automatically stopped after it has been initiated by a plateau in the electrical signal input.

Referring back to FIGURE 1, the amplifier 11 converts the low current signal from the photocell 10 in the colorimeter to an amplified signal $-V_x$ employed in the logarithmic analog-to-digital converter 12 and the program control unit 16. The signal $-V_x$ is also applied to the chart recorder 30, as noted hereinbefore, but for that purpose it is scaled by the potentiometer 31. A typical peak recorded and integrated is illustrated in FIGURE 5.

As long as the signal $-V_x$ contains no peak, the electrical base line signal $-V_o$ is equal to the signal input $-V_x$. Any voltage difference between the signal input $-V_x$ and the electrical base line signal $-V_o$ is due to drift of the colorimeter reference potential. The difference is detected in the logarithmic analog-to-digital converter 12 and converted to positive or negative time-interval pulses and transmitted over the lines 18 and 19, respectively, to the automatic base line corrector 17 which adjusts the electrical base line signal $-V_o$ until the difference is zero.

When a positive-going peak in the signal $-V_x$ begins, the program control unit 16 senses a positive slope in excess of a predetermined minimum level which may be adjusted to set the slope detector sensitivity. The output of the slope detector in the control unit terminates the operation of the automatic base line corrector 17 and activates the accumulator gate control 15. The amplitude of the peak is then periodically converted by the logarithmic analog-to-digital converter 12, with the electrical base line signal $-V_0$ held constant. Each time the peak amplitude is converted, a number of pulses proportional to the logarithm of the amplitude is stored in one of the accumulators.

On the trailing edge of the peak, the slope detector output eventually falls below a minimum level equal to, but of the opposite polarity of, the minimum positive slope. The program control unit 16 then causes the accumulator gate control 15 to stop transmitting digital signals from the logarithmic analog-to-digital converter 12 to the accumulator, thereby terminating an integration cycle. Thereafter, the print control 26 causes the sum of the accumulated digital signals to be printed. Thus, the program control unit 16 provides automatic integration for each peak, the integration cycle being automatically started when the absolute value of the positive slope of the peak exceeds a predetermined minimum level and automatically terminates the integration cycle when the absolute value of the negative slope of the peak falls below that minimum level.

Figure 4:
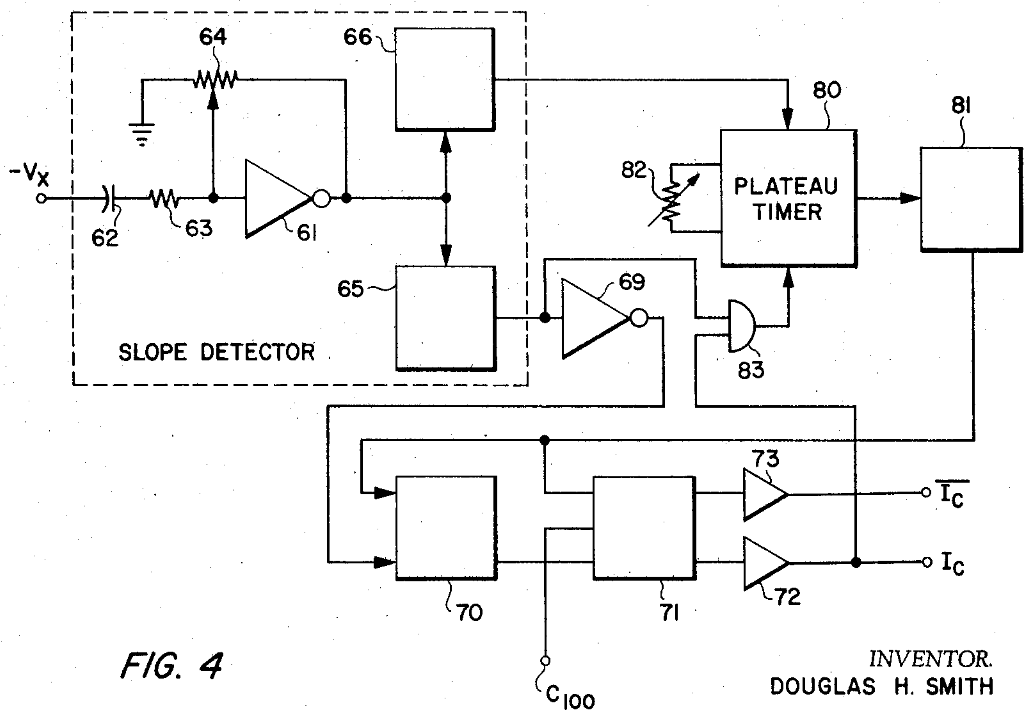
FIGURE 4 is a schematic diagram of a program control unit for the system of FIGURE 1.

Referring now to the schematic diagram of the program control in FIGURE 4, a slope detector 60 is provided comprising an operational amplifier 61 and a differentiating network including a capacitor 62, resistor 63, and potentiometer 64. The differentiating network takes the first derivative of the signal input to start and stop the integration cycle when the slope of a signal input peak, such as the signal illustrated in the first waveform of FIGURE 5, exceeds the slope detector sensitivity setting. The leading edge of the peak produces a positive derivative which is inverted by the amplifier 61 and applied to a pair of Schmitt trigger circuits 65 and 66. Accordingly, the first derivative of the signal input peak illustrated in FIGURE 5 is actually a negative signal for the leading edge of the peak and a positive signal for the trailing edge.

The Schmitt trigger circuit 65 is adjusted to switch its output terminal from +6 volts to 0 volt when its input signal exceeds a predetermined minimum level indicated by the line 67 in FIGURE 5. The output pulse from the Schmitt trigger circuit 65, illustrated by the waveform $ST_1$ in FIGURE 5, is inverted by an amplifier 69 to provide a positive pulse, illustrated by the waveform $\overline{ST_1}$ that sets an asynchronous buffer flip-flop 70 which in turn enables a synchronous start control flip-flop 71 to be set by a pulse from the clock source $C_{100}$ that is synchronized with the clock source $C_{10}$ connected to the integrating cycle control flip-flop 41 (FIGURE 2). The frequency of the clock pulse source $C_{100}$ is greater than that of the clock pulse source $C_{10}$ by a factor of 10. Noninverting amplifiers 72 and 73 couple the true and false output terminals of the start control flip-flop 71 to the automatic base line corrector illustrated in FIGURE 3. For convenience, the output terminals of the amplifiers 72 and 73, and the input terminals of FIGURE 3 to which they are connected, are identified by the respective legends IC and $\overline{IC}$.

As noted hereinbefore, the sensitivity of the slope detector may be adjusted. Thus, depending on the sensitivity setting, the slope detector will recognize a peak more or less quickly. The lower the sensitivity setting, the sooner the slope detector will respond. In a commercial embodiment of the present invention for an amino acid analyzer, seven different sensitivities may be selected ranging from 0.02 optical density units per minute to a greater sensitivity of 0.0002 optical density units per minute. The sensitivity selected depends upon the average peak height expected. For lower peak heights more sensitivity is preferred. However, instead of adjusting the detecting levels 67 and 68 (FIGURE 5) of the Schmitt trigger circuits 65 and 66, the differentiating network is adjusted through the potentiometer 64 such that for more sensitivity, the same slope will produce a signal at the output terminal of the amplifier 61 of greater amplitude. In other words, the gain of the operational amplifier is increased in order to increase the sensitivity of the slope detector, instead of the triggering threshold of the Schmitt trigger circuits 65 and 66.

The integration cycle is stopped when the slope of the trailing edge of the peak falls below the detection level of the Schmitt trigger circuit 66, which is when the slope falls below the sensitivity setting of the slope detector and the inverted first derivative is positive. That is accomplished by triggering the Schmitt trigger circuit 66 when the first derivative of the electrical signal $-V_x$ (inverted by the amplifier 61) exceeds the positive voltage level 68 to produce a positive pulse illustrated by the waveform $ST_2$ in FIGURE 5. The trailing edge of that positive pulse is translated by a plateau timer 80 to a pulse generator 81 to produce a pulse in a manner well known to those skilled in the art which is applied to the buffer flip-flop 70 and the start control flip-flop 71 to reset them and thereby terminate the integrating cycle.

If the electrical input signal $-V_x$ should shift in the manner illustrated in FIGURE 6 without a peak being present, the first derivative of that electrical signal input $-V_x$ inverted by the amplifier 61 provides a negative signal which will exceed the level 67 of the Schmitt trigger circuit 65, thereby producing a negative pulse which is inverted by the amplifier 69 to provide a positive pulse as shown by the waveform $\overline{ST_1}$. The leading edge of that positive pulse will set the buffer flip-flop 70. The start control flip-flop 71 is then set by the next clock pulse from the source $C_{100}$ to automatically start integration of the shaded area under the electrical input signal $-V_x$ shown in FIGURE 6. However, since a peak is not present in the electrical input signal $-V_x$, the first derivative (output signal from the amplifier 69) will return to zero and remain. Consequently, the Schmitt trigger circuit 66 remains in its initial state as shown by the waveform $ST_2$ and the pulse generator 81 is not actuated to reset the flip-flops 70 and 71 to stop integration.

If the integration cycle started by such a plateau is not stopped, the area under that plateau will be integrated together with the area under the next peak, thereby introducing a substantial error. Accordingly, it is desirable to stop the integration cycle before the next peak occurs, to recycle the integrator. The integral value of such a plateau would then be printed but it can be identified as a plateau integral and not a peak integral by reference to the record of the electrical signal input $-V_x$ and the base line signal $-V_0$ produced by the chart recorder 30 (FIGURE 1).

The plateau timer 80 (FIGURE 6) stops the integration cycle if the slope of the electrical signal input $-V_x$ remains less than the sensitivity setting for the slope detector for a preset time which may be adjusted by a potentiometer 82. The plateau timer 80 may be a conventional RC timing circuit which includes the potentiometer 82 so that the RC time constant may be adjusted to provide the desired time at which the pulse generator 81 is to be actuated to stop the integration cycle.

The plateau timer 80 is started through an AND gate 83 by the trailing edge of the pulse from the Schmitt trigger 65 illustrated by the waveform $ST_1$ in FIGURE 6. The AND gate 83 is enabled by a positive signal from the amplifier 72 if the start control flip-flop 71 is in the reset condition or zero state indicating that an integration cycle is not in progress. The output of the enabled AND gate 83 is employed to allow a charged capacitor to begin discharging through a resistor in much the same manner as the capacitor 40 is allowed to discharge through resistors 43 and 45 in the logarithmic converter illustrated in FIGURE 2 in response to a signal from control flip-flop 41. A detector, such as a Schmitt trigger circuit, determines when the capacitor has discharged to a predetermined level and thereupon activates the pulse generator 81 to terminate the integrating cycle.

Since the plateau timer 80 is activated each time an integration cycle is initiated, it is desirable to inactivate the plateau timer if a peak longer than the preset timer of the plateau timer 80 is present, a situation which may occur even though the plateau timer is adjusted for a time which will just exceed the longest expected peak. To indicate the plateau timer 80 in the presence of a peak signal, the output pulse of the Schmitt trigger circuit 66 is employed. For example, the output of the Schmitt trigger circuit 66 may be applied to an AND gate between the plateau timer 80 and the pulse generator 81 to inhibit activating the pulse generator 81 when the output signal $ST_2$ from the Schmitt trigger circuit 66 is positive just as activation of the plateau timer 80 is inhibited while the AND gate 83 receives a zero volt signal from the amplifier 72. The trailing edge of the positive pulse $ST_2$ (FIGURE 5) is then employed to trigger the pulse generator 81 through the plateau timer 80 in the same manner as the plateau timer would have triggered it.

Figure 7:
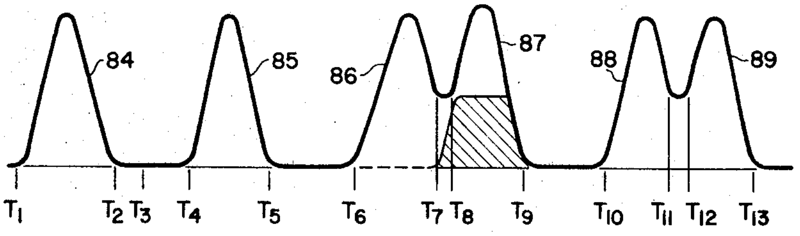
FIGURE 7 is a waveform diagram illustrating overlapping peaks and the error to be avoided in the operation of the automatic base line corrector of FIGURE 3.

FIGURE 7 illustrates a sequence of peaks 84 to 89 to be integrated. When the peak 84 begins, that is, at $T_1$ when the slope detector 60 (FIGURE 4) senses a positive slope value in excess of a minimum effectively set with the potentiometer 64, an integration cycle is started in a manner just described with reference to FIGURE 4. The amplitude of the peak is then sampled once every second in response to actuation of the flip-flop 41 in the converter (FIGURE 2) with respect to the electrical base line signal $-V_o$ maintained as a fixed reference. Each time the peak is sampled, a number of pulses proportional to the logarithm of the sampled voltage is stored in one of the accumulators. When the integration cycle is stopped at time $T_2$, the accumulator gate control 15 (FIGURE 1) switches the accumulating function to the alternate accumulator so that upon the occurrence of the next peak 85, integration may be started while the integral value of the peak 84 is printed. This allows a time interval from time $T_2$ to time $T_5$ to print the first peak integral and clear the first accumulator. During the interval between the two peaks 84 and 85, which is between the time $T_2$ and $T_4$, it is desirable to adjust the electrical base $V_o$ line signal to be equal to the electrical signal input $-V_x$. That is accomplished by energizing a relay 90 through an AND gate 91 in the automatic base line corrector illustrated in FIGURE 3. However, if two peaks occur so close to each other that they overlap, such as peaks 86 and 87, a large error occurs in the integration of the second peak (as illustrated in FIGURE 7 by the shaded area between $T_7$ and $T_9$) if the electrical base line signal $-V_o$ is adjusted during the short interval between the time $T_7$ when the integration cycle for the peak 86 is terminated and the time $T_8$ when the intergration cycle for the peak 87 is started.

Since the electrical input signal $-V_x$ to which the electrical base line signal $-V_o$ is adjusted is not at that time a true reference but simply the minimum or saddle between the two overlapping peaks, it is preferable to retain the same electrical base line signal $-V_o$ throughout the two successive integration cycles when two peaks occur so close to each other that they overlap in the manner illustrated for the peaks 88 and 89. That is accomplished by disabling the AND gate 91 for a predetermined period of time, such as from time $T_2$ to time $T_3$ following integration of the peak 84, sufficiently long to assure that the electrical input signal $-V_x$ has returned to its reference, and not simply to a minimum between two peak signals. To accomplish that, a delay timer 92 similar to the plateau timer 80 is provided with a potentiometer 93 in order that the time delay may be adjusted.

In operation, a flip-flop 94 is set by the signal $\overline{IC}$ from the amplifier 73 (FIGURE 4) to initiate the delay timer 92 and inhibit the gate 91. The flip-flop 94 is then reset by the delay timer 92 after a lapse of the predetermined time established by the potentiometer 93. The AND gate 91 is not enabled to energize the relay 90 until the flip-flop 94 has been reset. In that manner a short delay is introduced to assure that the signal input $-V_x$ has returned to its reference level and not simply to a lower level between two overlapping peaks.

The positive and negative time interval pulses (which are positive in polarity) derived from the logarithmic converter illustrated in FIGURE 2 are applied to input terminals 95 and 96 connected respectively to the leads 18 and 19 (FIGURE 1). The positive time interval pulses at the input terminal 95 are transmitted by noninverting amplifier 97 and inverting amplifier 98 to a potentiometer 99 connected to the input terminal of an integrating amplifier 100. Similarly, the negative time interval pulses at the input terminal 96 are coupled to the potentiometer 99 by inverting amplifiers 101 and 102. The output signal from the amplifier 98 is $-10$ volts when a time interval pulse is present at the input terminal 95; otherwise the output signal from the amplifier 98 is zero volt. Similarly, the output signal from the amplifier 102 is $+10$ volts when a negative time interval is present at the input terminal 96; otherwise the output signal is zero volt. A common load resistor 103 is provided for both amplifiers 98 and 101. To avoid shorting the signal from one of the two amplifiers 98 and 102 through the other, suitable isolation is provided between the two, such as by buffer diodes in a manner familiar to those skilled in the art.

The integrating amplifier 100 integrates the positive, or negative, pulses to develop a signal across its intergrating capacitor 103 the amplitude of which is proportional to the time integral of the pulses. The polarity of that signal is opposite the difference between the signals $-V_o$ and $-V_x$ in such a manner as to reduce the time intervals of the pulses to zero by adjusting the electrical base line $-V_o$ to equal the electrical signal input $-V_x$. A voltmeter 105 is coupled to the amplifiers 97 and 101 by inverting amplifiers 106 and 107 in order to provide a visual display of the difference between the electrical base line signal $-V_o$ and the electrical signal input $-V_x$. To accomplish that, an RC filter 108 is connected in parallel with the voltmeter 107.

Figure 8:
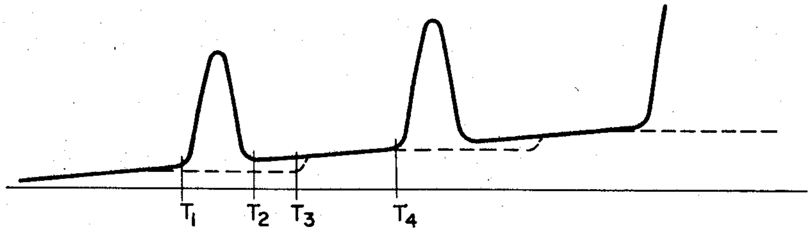
FIGURE 8 is a waveform diagram illustrating the normal operation of the automatic base line corrector.

The operation of the automatic base line corrector to maintain the electrical base line signal $-V_o$ constant while a peak is being integrated, and for a short delay time thereafter, is illustrated in FIGURE 8 which shows a first peak being integrated between the times $T_1$ and $T_2$ and automatic base line correction between the times $T_3$ and $T_4$. The potentiometer 99 (FIGURE 3) is provided to adjust the rate at which the electrical base line is corrected. It is desirable to maintain the rate relatively low so that the automatic base line corrector will not track the electrical signal input $-V_x$ too closely once the next peak is started for otherwise there would be a tendency to suppress the peak (subtract some of the area under the peak) since integration is not started until the slope of the peak has reached a predetermined minimum. The electrical base line signal $-V_o$ recorded by the chart recorder 30 will indicate whether the rate is too high for if it is, the recorded electrical base line signal $-V_o$ will have a mesa occurring each time a peak occurs, as a result of the automatic base line corrector 17 tending to track the electrical signal input $-V_x$ too closely.

Figure 9:
FIGURE 9 is a waveform diagram illustrating the manner in which the recorded base line may be employed to manually correct for base line drift during integration.

The recorded electrical base line signal $-V_o$ may be used to advantage in making graphical corrections to the peak integrals if the base line or reference of the electrical signal input $-V_x$ drifts during an integration cycle. As noted hereinbefore, the automatic base line correction cannot be made during the integration cycle. However, particularly for low peaks, the error introduced by base line drift during the integration cycle may be significant such as in the exaggerated peaks illustrated in FIGURE 9. Thus, when no integration cycle is in progress, the electrical base line signal $-V_o$ is continually corrected for drift of the reference or base line of the electrical input signal $-V_x$. When the integration of a peak starts, base line correction stops and the base line used for integration is maintained constant until the integration is complete and for a short delay period thereafter. However, the base line correction does not affect the electrical input signal $-V_x$ recorded by the chart recorder 30 which also records the electrical base line signal $-V_o$. Since the integral of each peak is based on the electrical base line signal $-V_o$, it is sometimes desirable to adjust for any drift during integration by a reference to the record of the signals $-V_x$ and $-V_o$. In other words, if the base line drifts during peak integration, the system continues integrating with reference to the base line levels at the beginning of the peak. After the integration cycle has been completed, the automatic base line corrector will adjust the base line, but for the peak just passed, the accumulated area count or integral will be miscalculated in proportion to the amount of drift. To correct for such drift it is necessary to add or subtract a portion of the peak area. The size of this portion is related to the difference between the base line or reference of the input signal $-V_x$ and the electrical base line signal $-V_o$. If the base line or reference of the electrical signal input $-V_x$ drifts upwardly during integration, as during the integration cycle for the first peak in FIGURE 9, the shaded portion between that reference and the electrical base line signal $-V_o$ should be subtracted. Similarly, if it drifts downwardly the shaded portion under the second peak in FIGURE 9 should be added. These areas are usually relatively small, but when they are not, as in the example illustrated in FIGURE 9, the miscomputed area can be a significant portion of the overall peak. By recording the automatically corrected base line signal $-V_o$, the operator may calculate the portion to be added or subtracted using graphical techniques. Calculations for these corrections are relatively simple to make since the portion to be added or subtracted will be very closely approximated by a triangle, rectangle, or trapezoid the areas of which may be quickly calculated and converted to a number to be added or subtracted to the integral automatically obtained and printed out for the particular peaks.

While the principles of the invention have now been made clear in an illustrative embodiment, obvious modifications particularly adapted for specific applications, environments and operating requirements may be made without departing from those principles. The appended claims are therefore intended to embrace any such modifications.

What is claimed is:

1. An apparatus for the automatic integration of the area under peaks of an electrical input signal waveform whose amplitude varies with time in which the integration is with respect to an electrical base line reference signal comprising:

analog to digital converter means having a first input terminal upon which the input electrical signal waveform is impressed and a second input terminal coupled to the electrical base line reference signal for providing a series of output pulse trains with each train of pulses representing an increment of area under a peak of the input signal waveform and for providing first or second control pulses having time durations which are a function of the logarithm of the ratio of the amplitude of said input electrical signal to the amplitude of said electrical base line reference signal, said first control pulses being produced when said ratio is less than one and said second control pulses when said ratio is greater than one;

base line correction means connected to said analog to digital converter and responsive to said first and second control pulses to vary the amplitude of the electrical base line reference signal until it is equal to the amplitude of the input electrical signal, the electrical base line reference signal being driven in a positive going direction in response to said first control pulse and in a negative going direction in response to said second control pulse;

accumulator means for totaling all the pulses in the series of said output pulse trains associated with each peak of the input electrical signal;

gating means connected between said analog to digital converter means and said accumulator means;

peak monitoring means responsive to the electrical input signal waveform for indicating the presence or absence of peaks in the input signal;

control means connected to said peak monitoring means, said gating means, and said base line correction means for enabling the gating means only during the presence of signal peaks and for enabling the base line correction means only during the absence of signal peaks; and, a recorder for continuously recording both said electrical input signal and said electrical base line reference signal as a function of time.

2. An apparatus as defined in claim 11 wherein said control means comprises:

a slope detector for determining when the slope of a peak of said input electrical signal exceeds a first predetermined value of one polarity and a second predetermined value of the opposite polarity and to enable said gating means to allow the accumulation of said output pulses when the slope first exceeds said first predetermined value of one polarity, and to disable said gating means and stop accumulation of said output pulses when the slope falls below said second predetermined value of opposite polarity after having first exceeded it; and, timing means coupled to said slope detector for stopping accumulation of said output pulses after a predetermined period has elapsed following the starting of accumulation by said electrical signal slope exceeding said first predetermined value unless a slope of opposite polarity which exceeds said second predetermined value has by that time occurred.

3. An apparatus as defined in claim 2 wherein said base line correction means includes:

a relay control means coupled to said slope detector for enabling said base line correction means only when accumulation of said output pulses is stopped.

4. An apparatus as defined in claim 3 wherein said base line correction means further includes a delay timer connected to said relay control means for delaying the enabling of said base line correction means for a predetermined period of time after said accumulation of said output pulses is stopped.

5. An apparatus as defined in claim 4 wherein said first and second control pulses have a direct relation to the algebraic sign of the difference between said electrical signal and said electrical base line reference signal, said first control pulse being produced when the sign is negative and said second control pulse when the sign is positive; and, said base line correction means is responsive to the time duration of said first or second control pulses.

6. An apparatus as defined in claim 5 wherein said converter comprises:

a flip-flop gated diode means for first charging a capacitance to a predetermined potential and then discharging said capacitance at a predetermined rate through the potential levels of said electrical signal and said electrical base line reference signal;

comparator amplifier means responsive to said capacitance potential, electrical signal and electrical base line reference signal for producing a first or second control pulse the duration of which corresponds to the time required for said capacitance to discharge from one of said potential levels to the other, and the production of which corresponds to the relative amplitude of said electrical signal to said electrical base line reference signal;

a source of clock pulses; and, gate means coupled to said clock pulse source and responsive to said time duration of said first control pulses for gating clock pulses from said source to said accumulator as an indication of the time interval of said first control pulse.

7. An apparatus as defined in claim 6 wherein said means for producing a first or second control pulse comprises:

first and second amplifiers, each having an output terminal and a pair of differential input terminals, one of said pair of terminals of each being connected to ground, the second input terminal of said first amplifier being adapted to sum part of the discharge current from said capacitance plus a current proportional to said electrical signal, and the second input terminal of said second amplifier being adapted to sum the remaining part of the discharge current from said capacitor plus a current proportional to said electrical base line reference signal;

logic means coupled to output terminals of said first and second amplifiers for producing said second control pulse when said output terminal of said first amplifier changes polarity before the output terminal of said second amplifier changes sign and until said output terminal of said second amplifier changes polarity, and producing said first control pulse when said output terminal of said second amplifier changes polarity before the output terminal of said first amplifier changes sign and until said first amplifier changes polarity; and, synchronizing means for first charging said capacitance while disabling said logic means and then enabling said logic means while discharging said capacitance through the potential levels of said electrical signal and said electrical base line reference signal.

8. An apparatus as defined in claim 1 further comprising printing means coupled to said accumulator for printing at selected time intervals a number representing the total number of output pulses accumulated by said accumulator for each peak in said electrical input signal waveform.

9. An apparatus for the automatic integration of the area under a series of peaks of an input electrical signal waveform in which the integration is with respect to an electrical base line reference signal comprising:

means for sampling the input electrical signal waveform at a predetermined rate and providing a series of output pulses, each pulse having a time duration which is a function of the instantaneous amplitude of the input signal at the sample time and representing an increment of area under a peak of the input signal said sampling means including means for producing at selected time periods first or second control pulses;

accumulator means connected to said sampling means for totaling the time durations of said series of output pulses associated with each peak in the input electrical signal waveform;

base line correction means connected to said signal sampling means and responsive to said first or second control pulse to vary the amplitude of said base line reference signal until it is equal to the amplitude of said input electrical signal, said base line correction means driving the reference signal in a positive going direction in response to said first control pulse and in a negative going direction in response to said second control pulse;

peak monitoring means responsive to the input electrical signal waveform for sensing the presence or absence of a signal peak in the input signal;

control means connected to said peak monitoring means and coupled to said base line correction means and said accumulation means for enabling said base line correction means only during the absence of a peak in said input signal waveform and for enabling said accumulator means to total the time durations of said output pulses only during the presence of a peak in the input signal; and, recording means for continuously recording both the waveforms of the input electrical signal and the electrical base line reference signal.

10. Apparatus as claimed in claim 9 wherein said control means includes means for identifying twin peaks in said input signal and maintaining the base line correction means disabled upon the occurrence of such twin peaks.

11. An apparatus for integrating the area under peaks of the input signal waveform whose amplitude varies as a function of a quantity being measured in which the integration is performed with respect to an electrical base line reference signal comprising:

analog to digital converter means for receiving the input electrical signal waveform and the base line reference signal to provide a plurality of output pulses representing increments of area under the input signal waveform peaks;

base line correction means for varying the amplitude of the base line reference signal until it is equal to the amplitude of the input signal waveform;

peak monitoring means responsive to the input signal waveform for identifying the presence or absence of peaks in the input signal waveform;

control means connected to said peak monitoring means and said base line correcting means for disabling the base line correcting during the presence of input signal peaks and enabling the base line correction means during the absence of input signal peaks;

accumulator means connected to said analog to digital converter means for accumulating all of the output pulses associated with each input signal peak; and, a recorder for continuously recording both waveforms of said input electrical signal and said electrical base line reference signal.

12. An apparatus for automatically integrating the area under peaks of an input electrical signal waveform whose amplitude varies with time wherein the integration is performed with respect to an electrical base line reference signal comprising:

analog to digital converter means for receiving said input signal and said electrical base line reference signal and providing a series of output pulse trains with each train of pulses representing an increment of area under a peak of the input signal waveform and providing first or second control pulses;

base line correction means connected to said analog to digital converter means and responsive to said control pulses for varying the amplitude of said electrical base line reference signal until it is equal to the amplitude of the input electrical signal, said base line correction means being responsive to said first control pulses to drive the ampltiude of said electrical base line reference signal in a positive going direction and responsive to said second control pulse to drive the amplitude of the electrical base line reference signal in a negative going direction;

peak determining means responsive to the input electrical signal waveform for identifying the presence or absence of peaks in the input signal waveform;

accumulator means connected to said analog to digital converter means for accumulating the total number of pulses in said series of output pulse trains associated with each input signal peak; and, control means connected to said peak detector, to said base line corrector and to said analog to digital converter for disabling said base line corrector and enabling said accumulator during the presence of peaks in the input signal waveform and enabling said base line corrector and disabling said accumulator during the absence of peaks in said input signal.

13. Apparatus as claimed in claim 12 wherein said analog to digital converter includes a logarithmic converter for producing output pulses having time intervals which are a function of the logarithm of the ratio of the amplitude of the input electrical signal to the amplitude of the electrical base line reference signal.

14. An apparatus for the automatic integration of the area under peaks of an input electrical signal waveform whose amplitude varies as a function of a quantity being measured wherein the integration is performed with respect to an electrical base line reference signal comprising:

converter means coupled to said input electrical signal and said base line reference signal for providing a series of output pulses and first and second control pulses, said output pulses representing selected increments of area under peaks in said input signal, said output pulses and said control pulses having time duration intervals which are a function of the logarithm of the ratio of the amplitude of said input electrical signal to the amplitude of said electrical base line reference signal, said first control pulse being produced when said ratio is less than one and said second control pulse when said ratio is greater than one;

base line correction means connected to said converter means and responsive to said first and second control pulses to vary during selected time intervals the amplitude of the electrical base line reference signal until it is equal to the amplitude of the input electrical signal, said base line correction means varying said base line reference signal in a positive going direction in response to said first control pulse and in a negative going direction in response to said second control pulse;

accumulator means operatively coupled to said converter means for receiving and totaling the time intervals of all the output pulses associated with a given peak appearing in the input electrical signal;

peak monitoring means responsive to the input electrical signal waveform for determining the presence or absence of peaks in the input signal;

control means connected to said peak monitoring means, said base line correction means and said accumulator means for activating said accumulator means to receive said output pulses and disabling said base line correction means during the presence of a peak in the input signal and deactivating said accumulator and enabling said base line correction means during the absence of a peak in the input signal; and recording means for continuously recording the waveforms of both the input electrical signal and the base line reference signal.

15. Apparatus as defined in claim 14 wherein said control means includes means for recognizing twin peaks in said input electrical signal waveform and means for preventing the correction of the base line reference signal in the interval between twin peaks upon the occurrence thereof.

16. An apparatus for integrating the area under peaks of an input signal waveform whose amplitude varies as a function of a quantity being measured in which the integration is performed with respect to an electrical base line reference signal comprising:

a logarithmic converter for receiving said input electrical signal and said electrical base line reference signal and providing a plurality of output pulses for each signal peak, each output pulse having a time duration as a function of the logarithm of the ratio of the magnitude of the input signal to the magnitude of the base line reference signal;

means connected to said logarithmic converter and responsive to said plurality of time duration output pulses for providing a series of output pulse trains, each train of pulses consisting of a plurality of equally spaced pulses the number of which is a function of the time duration of a corresponding time duration output pulse and represents an increment of area under a peak of the input signal waveform; and accumulator means for receiving said series of output pulse trains and accumulating the total number of pulses in the series of output pulse trains, said total number of pulses being indicative of the total area under a peak of the input signal waveform.

17. The apparatus defined in claim 16 further comprising:

base line correction means for varying the amplitude of the base line reference signal until it is equal to the amplitude of the input signal waveform;

peak monitoring means responsive to the input signal waveform for identifying the presence or absence of peaks in the input signal waveform; and control means connected to said peak monitoring means and said base line correcting means for disabling the base line correcting during the presence of input signal peaks and enabling the base line correction means during the absence of input signal peaks.

References Cited

UNITED STATES PATENTS

| | | | |
|---|---|---|---|
| 3,070,786 | 12/1962 | MacIntyre | 340—347 |
| 3,228,230 | 1/1966 | Thiele | 73—23.1 X |
| 3,353,034 | 11/1967 | Betz et al. | 307—265 |
| 3,359,410 | 12/1967 | Frisby et al. | 235—183 |
| 3,412,241 | 11/1968 | Spence et al. | 235—183 |

EUGENE G. BOTZ, Primary Examiner

F. D. GRUBER, Assistant Examiner

U.S. Cl. X.R.

73—23.1; 235—92, 151.35; 307—265, 294; 328—67, 129; 340—347

PO-1050
(5/69)

UNITED STATES PATENT OFFICE
CERTIFICATE OF CORRECTION

Patent No. 3,506,818 Dated April 14, 1970

Inventor(s) Douglas H. Smith

It is certified that error appears in the above-identified patent and that said Letters Patent are hereby corrected as shown below:

Column 14, Line 27, Claim 2, change "11" -- to read -- 1

SIGNED AND
SEALED
AUG 11 1970

(SEAL)
Attest:

Edward M. Fletcher, Jr.
Attesting Officer

WILLIAM E. SCHUYLER, JR.
Commissioner of Patents